United States Patent [19]

Reinartz et al.

[11] Patent Number: 4,848,847

[45] Date of Patent: Jul. 18, 1989

[54] PRESSURE SUPPLY SYSTEM ESPECIALLY FOR BRAKE SYSTEMS OF MOTOR VEHICLES

[75] Inventors: Hans D. Reinartz, Frankfurt/Main; Helmut Steffes, Hattersheim; Franz Latka, Niddatal, all of Fed. Rep. of Germany

[73] Assignee: Alfred Teves GmbH, Frankfurt am Main, Fed. Rep. of Germany

[21] Appl. No.: 921,750

[22] Filed: Oct. 22, 1986

[30] Foreign Application Priority Data

Oct. 26, 1985 [DE] Fed. Rep. of Germany ....... 3538120

[51] Int. Cl.[4] ........................ B60T 13/18; G01L 7/16; H01H 35/24

[52] U.S. Cl. ............................... 303/11; 303/DIG. 3; 73/744; 200/81.4; 340/452

[58] Field of Search ...................... 73/146.5, 717, 723, 73/744, 753, 745; 60/41 B; 288/151 R; 303/10, 11, 12, 100, 116, 92, DIGS. 1-4; 340/52 C, 626; 200/81.4, 82 R; 417/38, 44

[56] References Cited

U.S. PATENT DOCUMENTS

| | | | |
|---|---|---|---|
| 903,892 | 11/1903 | Schneider | 303/11 |
| 2,999,912 | 9/1961 | Kincaid et al. | 200/82 R |
| 3,277,441 | 10/1966 | Gutjaht | 200/81.4 |
| 4,402,554 | 9/1983 | Belart | 303/10 |
| 4,523,791 | 6/1985 | Belart et al. | 303/92 |
| 4,753,492 | 6/1988 | Leiber et al. | 303/DIG. 3 |

FOREIGN PATENT DOCUMENTS

| | | |
|---|---|---|
| 1216696 | 5/1966 | Fed. Rep. of Germany . |
| 1765165 | 4/1968 | Fed. Rep. of Germany . |
| 2421648 | 5/1974 | Fed. Rep. of Germany . |
| 2429277 | 1/1975 | Fed. Rep. of Germany . |
| 2022556 | 4/1978 | Fed. Rep. of Germany . |
| 2723719 | 11/1978 | Fed. Rep. of Germany . |
| 3140800 | 4/1983 | Fed. Rep. of Germany . |
| 3347473 | 7/1985 | Fed. Rep. of Germany . |
| 3408872 | 9/1985 | Fed. Rep. of Germany . |
| 3511639 | 10/1985 | Fed. Rep. of Germany . |
| 0600026 | 1/1926 | France . |
| 0468592 | 9/1967 | Switzerland . |
| 2107931 | 5/1983 | United Kingdom . |

*Primary Examiner*—Andres Kashnikow
*Assistant Examiner*—Timothy Newholm
*Attorney, Agent, or Firm*—James B. Raden

[57] ABSTRACT

A pressure supply system for the generation of the auxiliary pressure of a hydraulic brake system for motor vehicles comprises an accumulator, a hydraulic pump driven by electromotive force and a pressure switch (1) controlling the turning on and off of the hydraulic pump. The pressure switch (1) includes a switch piston (2) having a piston rod (5) mechanically actuating in a pressure-responsive manner, successively, two or three switches (8,9,10). The pump motor (26), by way of these switches, and by way of a relay, is turned on when a bottom pressure limit value ($P_U$) is reached, and turned off when the upper pressure limit value ($P_O$) is reached and exceeded. A holding circuit is connected in the electric circuit, in which are provided the switches (8,9,10) of the pressure switch (1), which holding circuit ensures an abrupt switch-over of the relay into the other switching position when a slow approach of a pressure (p) to the pressure limit values ($p_U$, $P_O$) causes fluttering of the relay contacts.

2 Claims, 1 Drawing Sheet

PRESSURE SUPPLY SYSTEM ESPECIALLY FOR BRAKE SYSTEMS OF MOTOR VEHICLES

BACKGROUND OF THE INVENTION

The present invention is concerned with a pressure supply system especially provided for generating the auxiliary pressure of a hydraulic brake system for motor vehicles. The system comprises an accumulator, a hydraulic pump driven by electromotic force, and a pressure switch which, by way of an interconnected motor relay, at a predetermined lower pressure limit, turns on the pump motor and, at a predetermined upper pressure limit, turns the pump motor off.

It is known in the art to automatically control the pressure in the auxiliary pressure supply system of a hydraulic brake system with the aid of a pressure switch and to maintain the pressure within the operating pressure range. Such a system, for example, if formed of a hydraulic reservoir charged and recharged with the aid of a hydraulic pump actuated by electromotive force. The pressure switch monitors at least two or, when combined with a pressure warning system, three switch points. In a system intially non-pressurized, first a warning lamp will flash until the lowest pressure value is reached. Thereafter, loading of the reservoir is continued until an upper switch point or an upper pressure limit value is reached. The pump, thereupon is reswitched only when, due to unloading of the reservoir, the pressure has dropped to a lower pressure limit value which is clearly below the upper threshold value. By this "hysteresis", a frequent turn on and off of the pump is avoided. However, it has to be ensured that the pressure remains within the limits and, hence, within the operating pressure range.

In conventional pressure switches and pressure warning switches of this type, the pump driving motor is turned on and off by way of a relay. However, in practice, substantial difficulties are encountered because, during the charging and decharging operation, the pressure slowly approaches the switch point. Although efforts have been taken to attain, by mechanical means, an abrupt-change characteristic or an abrupt change-type switch-over from one switching position into another switching position, frequently, when the switch point is approached, an instable or indifferent state of equilibrium occurs. If defective conditions, such as mechanical shocks, are added, which cannot be precluded in a motor vehicle, this will result in a fluttering of the switches or in an excitation of vibrations causing highly disadvantageous effects, with the consequence of increased wear. In vehicles including electronic systems, electromagnetic interference waves are generated. All measures taken to improve the switch characterisic require substantial mechanical efforts.

It is, therefore, an object of the present invention to overcome the shortcomings involved with conventional pressure supply systems and described and to develop a pressure switch suitable for such systems which is easy to manufacture and which, with a very slow change in the auxiliary pressure, ensures that the pump motor is turned on and off in an abrupt change-type manner.

SUMMARY OF THE INVENTION

It has been found that this problem is solved in a simple and technically progressive manner by means of an auxiliary pressure supply system of the described type, the typical feature of which resides in that the pressure switch includes a switch piston axially displaceable by the pressure to be controlled against a spring force. The switch piston, during displacement thereof, mechanically actuates successively at least two switches, one of which is associated to the lower pressure limit and the second of which is associated to the upper pressure limit, with the switches, during a lowering of the pressure below the lower limit value, activating the motor relay and a relay holding circuit and, during a rising of the pressure above the upper limit value, interrupting the holding circuit.

In the practice of the invention, the desired abrupt-change characteristic is achieved with the aid of a pressure switch having a piston displaceable in proportion to the pressure and a variety of switches of simple construction in conjunction with the motor relay and an electrical holding relay. The high mechanical efforts previously required for achieving an abrupt-change characteristic are thereby eliminated. According to an advantageous embodiment of the present invention, the pressure switch is furnished with a third switch, which operates as a pressure warning switch, actuated by the switch piston at a predetermined minimum pressure below the lower pressure limit value.

Another embodiment of the present invention resides in that the switch piston of the pressure switch is connected to an axial piston rod including radial cams to thereby successively actuate the individual switches in response to the pressure acting upon the piston and, hence, in response to the axial displacement. For that purpose, the switches can be in the form of simple contact springs which, upon an axial displacement of the piston rod, can be removed from the appertaining contact counterparts by mechanical engagement of the cams. The switching pressure can be adjusted by selecting and/or adjusting the spaces, that are defined when the pressure switch is in its initial position, between the contact springs and the appertaining actuating cams.

Moreover, in a multiplicity of cases it is of advantage if, in the practice of the present invention, a working contact of the motor relay is inserted into the holding circuit in series with a contact closed in the resting position of the switch associated to the upper pressure limit value, with both the pump motor and the holding circuit of the motor relay, advantageously, being turned on and off by way of a common working contact of the motor relay and with, morever, the switch associated to the upper pressure limit value and a resistance limiting the current to the value required for maintaining the relay in the activated position being inserted into the holding circuit.

BRIEF DESCRIPTION OF THE DRAWING

Further features, advantages and applications of the present invention are set forth in the following description when taken in conjunction with the accompanying drawing wherein.

DETAILED DESCRIPTION

Figure 1:
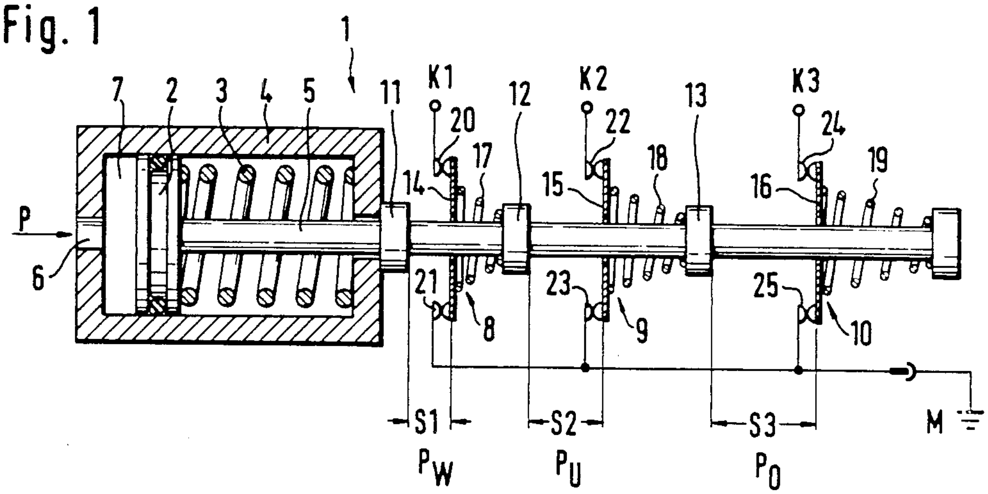
FIG. 1 schematically shows a simplified illustration of a switch piston displaceable in response to pressure along with the appertaining electrical switches according to one embodiment of the present invention.

Referring to the drawing, FIG. 1 shows one embodiment of a pressure switch of the pressure supply system of the present invention. The pressure switch 1 is substantially composed of a switch piston 2 disposed in a manner axially displaceable against the force of a spring 3 in a cylindrical housing 4. The piston 2 comprises a piston rod 5 which, upon axial displacement of the switch piston 2, actuates a variety of switches.

The pressure p to be regulated or controlled, by way of an inlet opening 6, is transferred into a front chamber 7 in the interior of the housing 4 and applied to the neighboring front face of the switch piston 2 thereby permitting an axial displacement of piston 2 against the force of spring 3 in proportion of pressure p.

In the example as shown, three switches 8, 9, 10 are provided which, upon displacement of the switch piston 2, are successively actuated by piston rod 5. For, piston rod 5 carries switch cams 11, 12, 13 in the form of radial extensions, which each corresponds to a respective switch 8, 9, or 10, and which each actuates an appertaining switch 8, 9 or 10 as soon as the respective face of engagement of a switch cam comes into engagement with a switch 8, 9, or 10. In FIG. 1 of the drawing, the switches are symbolized by contact springs 14, 15, 16 which, in the resting position as shown, at both sides are forced by the force of the closure springs 17, 18, 19 against the contact-counterparts 20 to 25, thereby closing the appertaining current circuits, see FIGS. 2 to 4.

The spaces S1, S2, and S3 between the individual cams 11, 12, and 13 and the respective individual contact springs 14, 15, and 16 are different, thereby allowing for successive actuation of the switches upon axial displacement of switch piston 2 and piston rod 5.

In the example as shown, the spaces S1, S2 and S3 are enlarged from left to right so that with an increasing pressure and an axial displacement to the right, the switches 8, 9 and 10 are successively actuated from left to right. When the pressure is relieved and the switch piston 2 restored to the position as shown, switches 8, 9 and 10 are re-closed in the reverse order.

Pressure switch 1 according to FIG. 1, hence, includes three switch points, with the one associated to the lowest pressure value $p_W$ actuating a warning light WL when distance S1 is traversed. With a further pressure rise, space S2 is traversed and, as soon as the lower pressure limit value $p_U$ is reached, switch 9 is opened. When the upper pressure limit value $p_O$ is reached, switch 10 is actuated, thereby turning off the pump of the pressure supply system according to the invention. The three switches 8, 9 and 10 with one terminal lead to common base connection M and with the other terminals lead to connections K1, K2 and K3, respectively.

Figure 2:
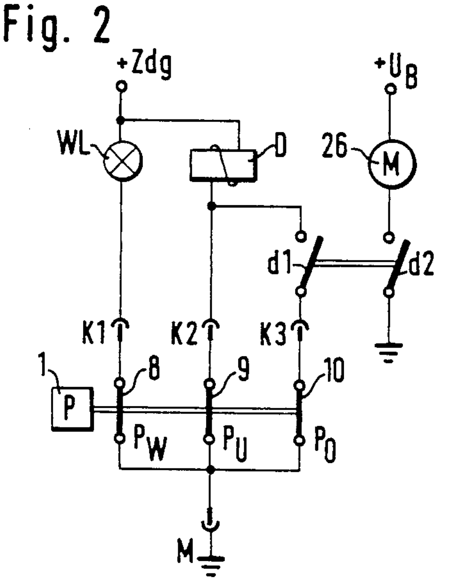
FIG. 2 shows an electric circuit for the arrangement according to FIG. 1.

FIG. 2 shows one embodiment of a circuit capable of controlling the pressure supply system in conjunction with pressure switch 1 according to FIG. 1. In the resting position of the pressure switch 1, as shown, the current conduits are closed by way of switches 8, 9 and 10. Hence, the pressure in the system has not yet reached the bottom limit value $p_W$, the so-called warning threshold. After turning on the ignition by way of terminal +Zdg, a warning light WL will light up. A motor relay D is activated by way of switch 9 and terminal K2. Upon activation, motor relay D closes working contact d1, to close a holding circuit leading over terminal K3 and switch 10. Hence, during a (temporary) opening of switch 9, relay D continues to be in the activated position.

The driving motor 26 of the hydraulic pump of the pressure supply system is turned on by way of motor relay D closing contact d2 simultaneously with contact d1. $U_B$ symbolizes the supply battery voltage of the motor vehicle.

When a rise in the pressure occurs, first the warning threshold $p_W$ is reached, with switch 8 open and warning lamp WL going out. As soon as the lower pressure limit $p_U$ is reached, switch 9 opens. However, relay D, by way of the holding circuit, continues to be in the activated position. It is only when the upper pressure limit value $p_O$ is reached that the third switch, switch 10, is actuated, with relay D opening to render the pump driving motor 26 inoperative. When the pressure decreases, only the closure of switch 9 will again cause motor relay D to be activated and, therefore, the motor 26 to be turned on; because, the closure of switch 10 during a pressure drop to below the upper pressure limit value $p_O$ will initially have no effect on motor relay D due to the opened contact d1.

Figure 3:
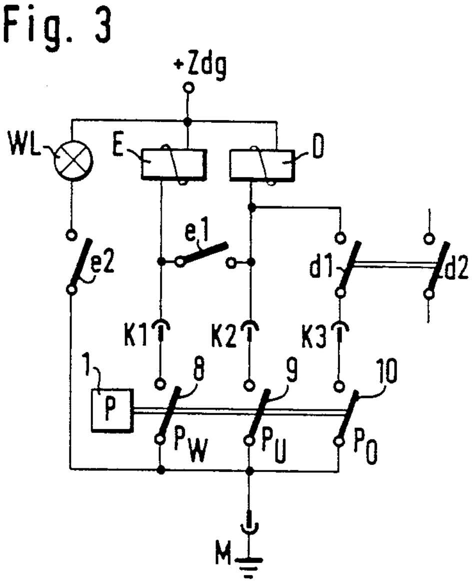
FIG. 3 shows a circuit extended over the one according to FIG. 2 for the arrangement according to FIG. 1; and, FIG. 4 shows an alternate embodiment of the electric circuit for the arrangement according to FIG. 1.

FIG. 3 shows another circuit by way of which, in conjunction with pressure switch 1 according to FIG. 1, the pressure can be controlled in the supply system of the invention. For illustration purposes, the switch position was selected here at a pressure above the upper pressure limit value $p_O$. In the example of the embodiment according to FIG. 3, a second relay E operates, when the pressure drops below the warning threshold $p_W$ and closes switch 8, to close the conacts e1, e2, thereby turning on the warning light WL. The holding circuit, by way of contact e1 and switch 9, precludes a scorching of the contacts of switch 8, which would be likely to occur if the pressure very slowly approached the warning threshold $p_W$, thereby causing an instable switch position. For, the floating of the pressure about the warning threshold $p_W$ could result in a fluttering of the switch 8.

Figure 4:
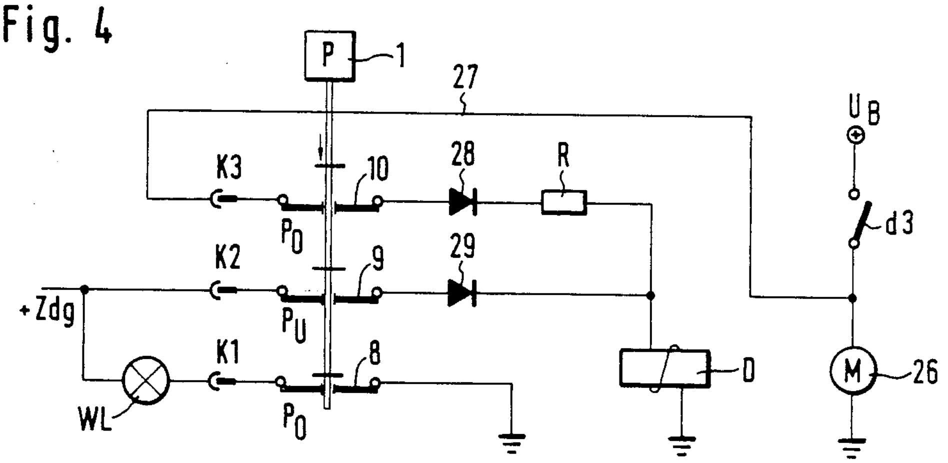

Finally, the form of embodiment of the circuit according to FIG. 4 permits a particularly simple construction comprising only one motor relay working contact d3. For, in that arrangement a holding circuit for motor relay D is formed by way of contact d3, electrical conduit 27, switch 10 of pressure switch 1, diode 28, and an ohmic resistance R. Resistance R restricts the current to the holding circuit to a value which is sufficient only for maintaing relay D in the activated position, but not for activating the relay D. Hence, relay D, by way of the holding circuit, is maintained in the activated position at a pressure rising beyond the bottom pressure limit value $p_U$ until the upper pressure limit value $p_O$ is reached and switch 10 opened. At this time the holding circuit by way of line 27 is opened, causing relay D to de-activate, thereby opening contact d3, which in turn causes motor 26 to turn off. Motor 26 is turned on again only after the pressure, having dropped to the bottom pressure limit value $p_U$, causes switch 9 to close, which in turn causes relay D to activate and close contact d3.

Diodes 28 and 29 serve to decouple the alternate current conduits that correspondingly pass through switches 9 and 10, and relay D, to ground. The circuit according to FIG. 4 is identical with the circuits as described with reference to FIGS. 2 and 3, for which reason identical reference characters have been employed.

What is claimed is:

1. A pressure supply system for generating the auxiliary pressure of a hydraulic brake system for motor vehicles, comprising an accumulator, a hydraulic pump actuated by electromotive force, a pump motor for the hydraulic pump, a motor relay (D), a relay circuit, and a pressure switch which turns on the pump motor by way of the motor relay at a predetermined lower pressure limit value and turns off said pump motor at a predetermined upper pressure limit value, wherein the pressure switch (1) comprises a plurality of switches, a switch piston (2), and a spring (3), the switch piston (2) being axially displaceable against the force of the spring in proportion to the pressure to be controlled, which switch piston, upon displacement thereof, mechanically actuates successively at least two of said switches with one switch being associated with the lower pressure limit value ($p_U$) and one switch being associated with the upper pressure limit value ($P_O$), with the switches turning on the motor relay (D) and the relay holding circuit when the pressure drops below the lower pressure limit value ($p_U$), and interrupting the relay holding circuit when the pressure rises beyond the upper pressure limit value ($P_O$), and comprising a common working contact (d3) of the motor relay (D) inserted into the relay holding circuit of the motor relay (D) in series with one of said switches, wherein both the pump motor (26) and the relay holding circuit of the motor relay (D) are turned on and off by way of the common working contact (d3), and a resistance (R), which is inserted into the relay holding circuit, for limiting the current to the value required for maintaining the motor relay (D) in the actuated position.

2. A pressure supply system for generating the auxiliary pressure of a hydraulic brake system for motor vehicles, comprising an accumulator, a hydraulic pump actuated by electromotive force, a pump motor for the hydraulic pump, a motor relay (D), a relay holding circuit, and a pressure switch which turns on the pump motor by way of the motor relay at a predetermined lower pressure limit value and turns off said pump motor at a predetermined upper pressure limit value, wherein the pressure switch (1) comprises a plurality of switches, a switch piston (2), and a spring (3), the switch piston (2) being axially displaceable against the force of the spring in proportion to the pressure to be controlled, which switch piston, upon displacement thereof, mechanically actuates successively at least two of said switches with one switch being associated with the lower pressure limit value ($p_U$) and one switch being associated with the upper pressure limit value ($P_O$), with the switches turning on the motor relay (D) and the relay holding circuit when the pressure drops below the lower pressure limit value ($p_U$), and interrupting the relay holding circuit when the pressure rises beyond the upper pressure limit value ($P_O$);

wherein the pressure switch (1) is equipped with a third switch being actuated by the switch piston (2) at a predetermined minimum pressure ($p_W$) below the lower pressure limit value ($p_U$) and turning on and off a warning signal;

and wherein the the pressure supply system further comprises a warning signal relay (E) equipped with working contacts (e1, e2), wherein said third switch generates the warning signal by way of the warning signal relay (E) and said working contacts (e1) is located in series with the switch, which is associated with said lower pressure limit value, ($p_U$), to form a holding circuit for the warning signal relay (E).

* * * * *